US007091858B2

(12) United States Patent
Copeland et al.

(10) Patent No.: US 7,091,858 B2
(45) Date of Patent: Aug. 15, 2006

(54) WIDE EXIT ELECTRONIC ARTICLE SURVEILLANCE ANTENNA SYSTEM

(75) Inventors: Richard L. Copeland, Boynton Beach, FL (US); Stewart Hall, Wellington, FL (US); William Farrell, West Palm Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 10/341,824

(22) Filed: Jan. 14, 2003

(65) Prior Publication Data

US 2004/0135690 A1    Jul. 15, 2004

(51) Int. Cl.
*G08B 13/14* (2006.01)
(52) U.S. Cl. .............................. 340/572.1; 340/572.5; 340/572.7
(58) Field of Classification Search .. 340/572.1–572.9; 343/6.8, 787, 788
See application file for complete search history.

(56) References Cited

U.S. PATENT DOCUMENTS

| | | | | |
|---|---|---|---|---|
| 4,135,184 A * | 1/1979 | Pruzick | .................. | 340/572.5 |
| 4,308,530 A * | 12/1981 | Kip et al. | ................ | 304/572.2 |
| 4,947,179 A | 8/1990 | Ganter et al. | ............... | 343/715 |
| 5,065,138 A * | 11/1991 | Lian et al. | ............... | 340/572.2 |
| 5,220,338 A * | 6/1993 | Matsushita | .................. | 343/787 |
| 5,220,339 A | 6/1993 | Matsushita | .................. | 343/788 |
| 5,305,002 A * | 4/1994 | Holodak et al. | ............ | 343/788 |
| 5,345,222 A * | 9/1994 | Davies et al. | ............ | 340/572.7 |
| 5,408,243 A * | 4/1995 | D'Hont | ....................... | 343/718 |
| 5,459,451 A * | 10/1995 | Crossfield et al. | ....... | 340/572.7 |
| 5,532,598 A * | 7/1996 | Clark et al. | ................. | 324/326 |
| 5,567,537 A * | 10/1996 | Yoshizawa et al. | ......... | 428/800 |
| 5,602,556 A * | 2/1997 | Bowers | ....................... | 343/742 |
| 5,661,457 A * | 8/1997 | Ghaffari et al. | ........... | 340/572.7 |
| 5,726,630 A * | 3/1998 | Marsh et al. | ............... | 340/10.2 |
| 5,825,291 A * | 10/1998 | Platt et al. | ............... | 340/572.7 |
| 5,929,760 A * | 7/1999 | Monahan | ................. | 340/572.7 |
| 6,020,856 A * | 2/2000 | Alicot | ......................... | 343/742 |
| 6,134,188 A | 10/2000 | Ganter et al. | ................. | 368/47 |
| 6,137,411 A | 10/2000 | Tyren | ....................... | 340/572.1 |
| 6,172,608 B1 * | 1/2001 | Cole | ....................... | 340/572.1 |
| 6,400,273 B1 | 6/2002 | Bettine | ..................... | 340/572.4 |

(Continued)

OTHER PUBLICATIONS

U.S. Appl. No. 10/037,337, filed Dec. 21, 2001, Copeland, et al.

*Primary Examiner*—Benjamin C. Lee
*Assistant Examiner*—Son Tang

(57) ABSTRACT

An electronic article surveillance antenna system for wide exit interrogation zones is provided. In a first aspect, a first and a second transmit antenna, each adapted for installation on opposite sides of a wide interrogation zone. A third transmit antenna is adapted for installation adjacent the ceiling of the wide interrogation zone. The first, second, and third transmit antennas are connectable to a transmitter for generation of an interrogation signal for transmission into the wide interrogation zone. A plurality of amorphous core receiver antennas are adapted for installation in the grout region of a floor of the wide interrogation zone. The output of each of the plurality of amorphous core receiver antennas are connectable to a receiver for detection of a response signal from an electronic article surveillance tag disposed in the wide interrogation zone. The response signal is responsive to the interrogation signal. The plurality of amorphous core receiver antennas can be configured in a plurality of orthogonal pairs of amorphous core receiver antennas. In a second aspect, the transmit antennas are loop antennas and the receiver is comprised of a plurality of amorphous core receivers adapted for installation on opposite sides and the ceiling of the wide entrance.

8 Claims, 12 Drawing Sheets

U.S. PATENT DOCUMENTS 6,987,490 B1* 1/2006 Sano ......................... 343/788
2003/0107523 A1* 6/2003 Yahata et al. ............... 343/787
2005/0162331 A1* 7/2005 Endo et al. ................. 343/788

* cited by examiner

Lateral

Horizontal

Vertical

WIDE EXIT ELECTRONIC ARTICLE SURVEILLANCE ANTENNA SYSTEM

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to electronic article surveillance (EAS) systems and more particularly to an EAS antenna system adapted for environments having wide exits and entrances.

2. Description of the Related Art

Electronic Article Surveillance (EAS) systems are detection systems that allow the identification of a marker or tag within a given detection region. EAS systems have many uses, but most often they are used as security systems for preventing shoplifting in stores or removal of property in office buildings. EAS systems come in many different forms and make use of a number of different technologies.

A typical EAS system includes an electronic detection unit, markers and/or tags, and a detacher or deactivator. The detection units can, for example, be formed as pedestal units, buried under floors, mounted on walls, or hung from ceilings. The detection units are usually placed in high traffic areas, such as entrances and exits of stores or office buildings. The markers and/or tags have special characteristics and are specifically designed to be affixed to or embedded in merchandise or other objects sought to be protected. When an active marker passes through a marker detection region, the EAS system sounds an alarm, a light is activated, and/or some other suitable alert devices are activated to indicate the removal of the marker from the prescribed area.

Common EAS systems operate with these same general principles using either transceivers, which each transmit and receive, or a separate transmitter and receiver. Typically the transmitter is placed on one side of the detection region and the receiver is placed on the opposite side of the detection region. The transmitter produces a predetermined excitation signal in a marker detection region. In the case of a retail store, this detection region is usually formed at a checkout aisle or an exit. When an EAS marker enters the detection region, the marker has a characteristic response to the excitation signal, which can be detected. For example, the marker may respond to the signal sent by the transmitter by using a simple semiconductor junction, a tuned circuit composed of an inductor and capacitor, soft magnetic strips or wires, or vibrating resonators. The receiver subsequently detects this characteristic response. By design, the characteristic response of the marker is distinctive and not likely to be created by natural circumstances.

EAS systems are often called upon for coverage of a large detection area, such as a wide mall store entrance. The mall store entrance can sometimes cover the width of the mall store itself. Such relatively large detection areas require special design considerations. For example, the EAS system used for coverage must be carefully designed to avoid any gaps through which a marker might pass through undetected, while simultaneously avoiding false alarming caused by markers attached to store inventory which may be displayed near the detection region.

When conventional EAS antenna systems, typically formed of loop antennas, are used in openings wider than about 2.5 meters, detection performance begins to deteriorate. Wide mall store entrances may need detection areas up to 4 to 5 meters wide, or wider. As used herein, wide exits and wide entrances refer to exits/entrances having widths greater than about 2.5 meters, and which are typically 4 to 5 meters or wider. Attempts at solutions to the wide entrance environment include adding additional antennas in the floor and/or ceiling. Adding loop antennas in existing flooring causes many problems, as the floor must be torn up in order to install the loop antenna.

U.S. Pat. No. 6,400,273 discloses an example of a wide exit solution that includes additional floor and ceiling mounted antennas. A large loop transmit antenna is mounted either in the floor or the ceiling, and several large ferrite core receiver antennas are mounted in the floor or ceiling. As known in the art, loop pedestal antennas can also be mounted at the ends of the detection zone, but are limited in range and cannot cover a wide exit. Multiple antennas can be spaced apart with overlapping detection zones to cover a wide area. The floor and ceiling mounted loop transmit antenna and ferrite core receiver antennas have serious installation requirements because of their size.

BRIEF SUMMARY OF THE INVENTION

The present invention is an electronic article surveillance antenna system for wide exit interrogation zones and, in a first aspect, includes a first and a second transmit antenna, each adapted for installation on opposite sides of a wide interrogation zone. A third transmit antenna is adapted for installation adjacent the ceiling of the wide interrogation zone. The first, second, and third transmit antennas are connectable to a transmitter for generation of an interrogation signal for transmission into the wide interrogation zone. A plurality of amorphous core receiver antennas are adapted for installation in the grout region of a floor, or under the flooring, of the wide interrogation zone. The output of each of the plurality of amorphous core receiver antennas are connectable to a receiver for detection of a response signal from an electronic article surveillance tag disposed in the wide interrogation zone. The response signal is responsive to the interrogation signal.

The system may further include a fourth transmit antenna.

The plurality of amorphous core receiver antennas can be configured in a plurality of orthogonal pairs of amorphous core receiver antennas.

Each of the transmit antennas can be loop antennas. Alternately, each of the transmit antennas can be magnetic core antennas.

In a second aspect of the present invention, the electronic article surveillance antenna system for wide exit interrogation zones includes a first and a second transmit loop antenna. Each of the first and second transmit loop antennas are adapted for installation on opposite sides of a wide interrogation zone. A third transmit loop antenna is adapted for installation adjacent a ceiling of the wide interrogation zone. The first, second, and third loop transmit antennas are connectable to a transmitter for generation of an interrogation signal for transmission into the wide interrogation zone. A plurality of amorphous core receiver antennas includes one each adapted for installation on opposite sides of the wide interrogation zone and one each adapted for installation adjacent the third transmit loop antenna. The output of each of the plurality of amorphous core receiver antennas is connectable to a receiver for detection of a response signal from an electronic article surveillance tag disposed in the wide interrogation zone. The response signal is responsive to the interrogation signal.

The system may further include two each of the plurality of amorphous core receiver antennas adapted for installation on opposite sides of the wide interrogation zone and two each of the plurality of amorphous core receiver antennas adapted for installation adjacent the third transmit loop antenna.

The system may further include a fourth transmit loop antenna and two each of the plurality of amorphous core receiver antennas adapted for installation adjacent the fourth transmit loop antenna.

Objectives, advantages, and applications of the present invention will be made apparent by the following detailed description of embodiments of the invention.

BRIEF DESCRIPTION OF THE SEVERAL VIEWS OF THE DRAWINGS

FIGS. 6–8 are plots of the EAS tag pick rate for the embodiment of FIG. 5 for a 14-foot wide by 10-foot high entrance.

FIGS. 13–15 are plots of the EAS tag pick rate for the embodiment of FIG. 12 for a 14-foot wide by 10-foot high entrance.

FIGS. 20–22 are plots of the EAS tag pick rate for the embodiment of FIG. 19 for a 14-foot wide by 10-foot high entrance.

DETAILED DESCRIPTION OF THE INVENTION

During the early research phase for a solution to the wide exit antenna project, it was discovered that an amorphous core receiver antenna is significantly more sensitive compared to traditional loop antennas and ferrite core receiver antennas. In fact, the amorphous core receiver antenna had a higher sensitivity over the ferrite antenna by a factor of 10–20 per unit volume of core material. This early research led to the invention of the core transceiver antenna, U.S. patent application Ser. No. 10/037,337, filed on Dec. 21, 2001, the disclosure of which is incorporated herein by reference. The research also demonstrated that a very small and thin core receiver antenna could be made so that it could fit inside of the grout region in tile floors, or be easily mounted under the tile in the floor. An array of such receiver antennas could be used as a receiver antenna array for very wide detection systems. In addition to the small floor-mounted core receiver antennas, larger core receiver antennas can be used on the ceiling and/or sidewalls of the entrance zone if the floor installation was not desired. Either traditional loop transmitter antennas or core transmitter antennas could comprise the excitation field source for such a wide detection system.

Figure 1:
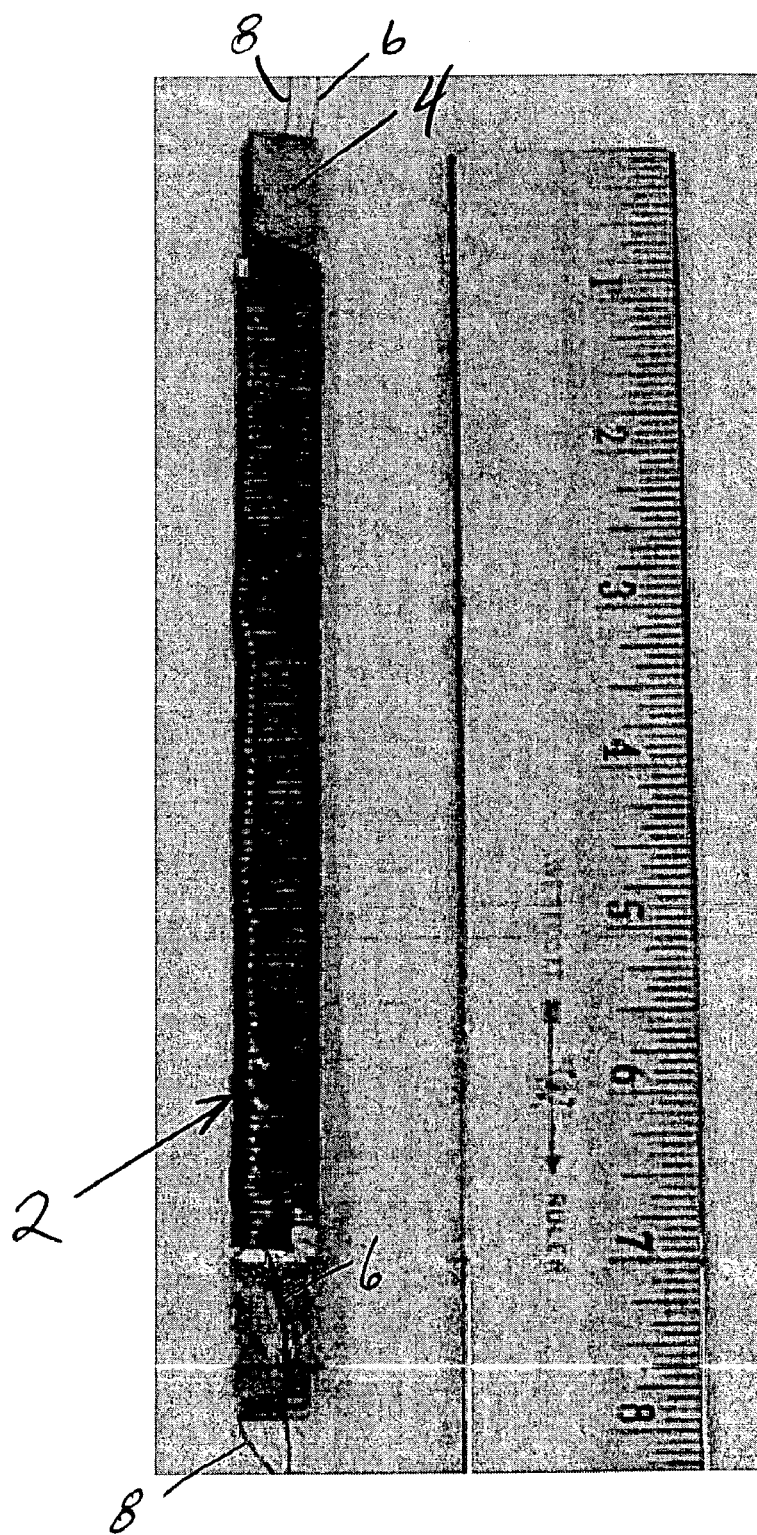
FIG. 1 is a top perspective view of an amorphous core receiver antenna used with the present invention.

Referring to FIG. 1, amorphous core receiver antenna 2 is illustrated, which is sized to fit into the grout region of a conventional tile floor. Core receiver antenna 2 consists of about 30 layers of a suitable amorphous ribbon 4, such as VC6025F available from Vacuumschmelze GmBH Co. (D-6450 Hanau, Germany), or other amorphous alloy with similar magnetic properties. Each amorphous ribbon is of approximate dimension of 1 cm. wide by 20 cm. long, and is coated with a thin insulting layer. The coating on each ribbon is sufficient to electrically isolate all layers to prevent eddy current losses. A thin dielectric layer is then placed around the core and an electrical winding 6 is placed surrounding the core. Typically, winding 6 is capacitively resonated to form a resonant R, L, and C series circuit. A secondary winding 8 is then placed over the first to allow an electrically isolated output, which can be cabled into a conventional electronic article surveillance receiver input. Preferably, the primary winding 6 and secondary winding 8 should be over the middle 75% of the core.

Figure 2:
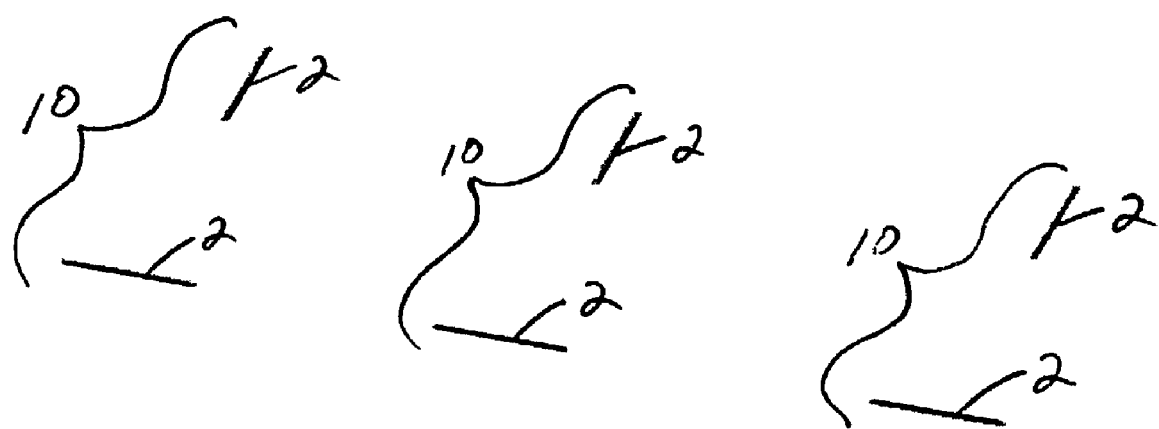
FIG. 2 is a perspective view of one implementation of array of receiver antennas of FIG. 1.

Referring to FIG. 2, a layout of a small array of core receiver antennas 2 mounted on the floor is illustrated. Two core receiver antennas 2 form an orthogonal pair 10. Three orthogonal pairs 10 are shown, but fewer or more pairs can be implemented in a particular installation depending on the width of the entrance/exit. Each orthogonal pair 10 of receiver core antennas 2 are summed electrically and forms one channel input. Orthogonal pairs 10 are summed rather than parallel pairs to improve noise immunity. If noise were mainly coming from one direction, summing in an orthogonal manner will yield improved signal/noise ratio.

Figure 3:
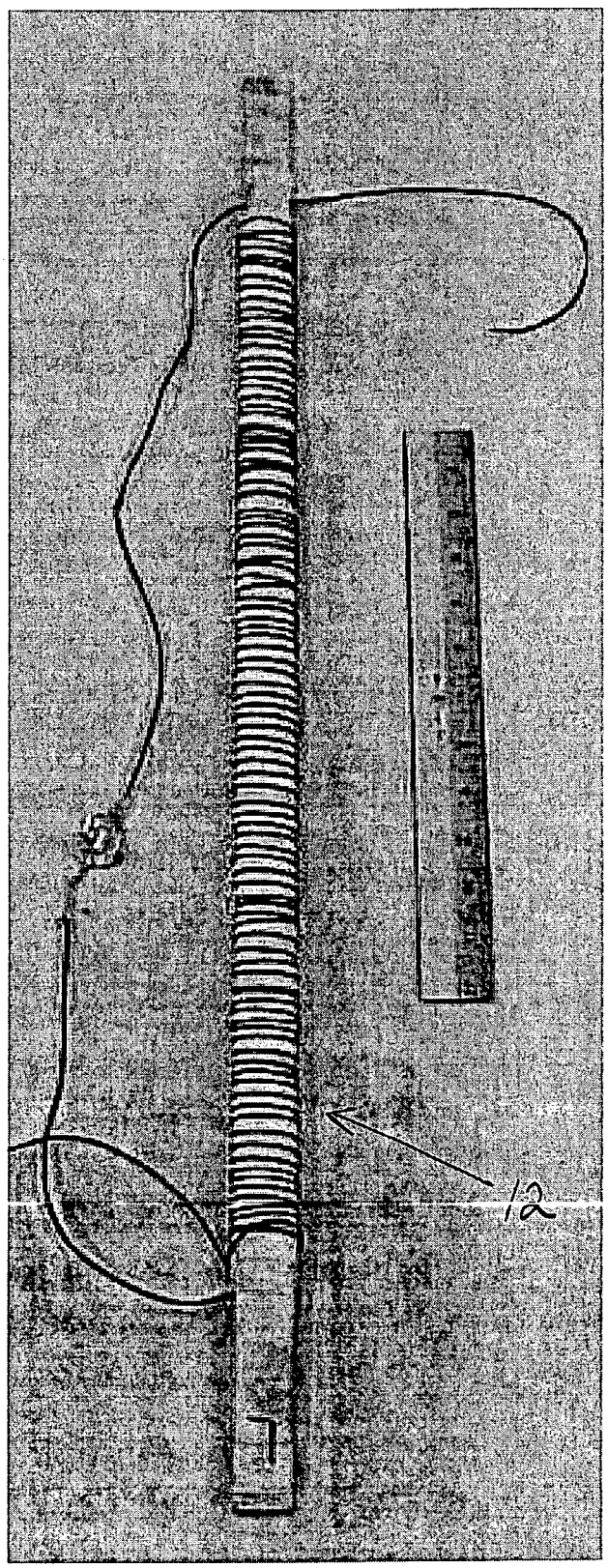
FIG. 3 is a top perspective view of a large amorphous core receiver antenna used with the present invention.

Referring to FIG. 3, large amorphous core receiver antenna 12 is very similar to amorphous core receiver antenna 2, described above. A typical overall size of antenna 12 is about 75 cm. long by 2 cm. wide by about 30 ribbons thick. In some installations it may not be possible to use small core receiver antennas 2 installed in the floor, as shown in FIG. 2. Alternately, an array of larger core receiver antennas 12 may be placed overhead on, or above the ceiling, and/or on the sidewalls of the entrance zone of the store.

Figure 4:
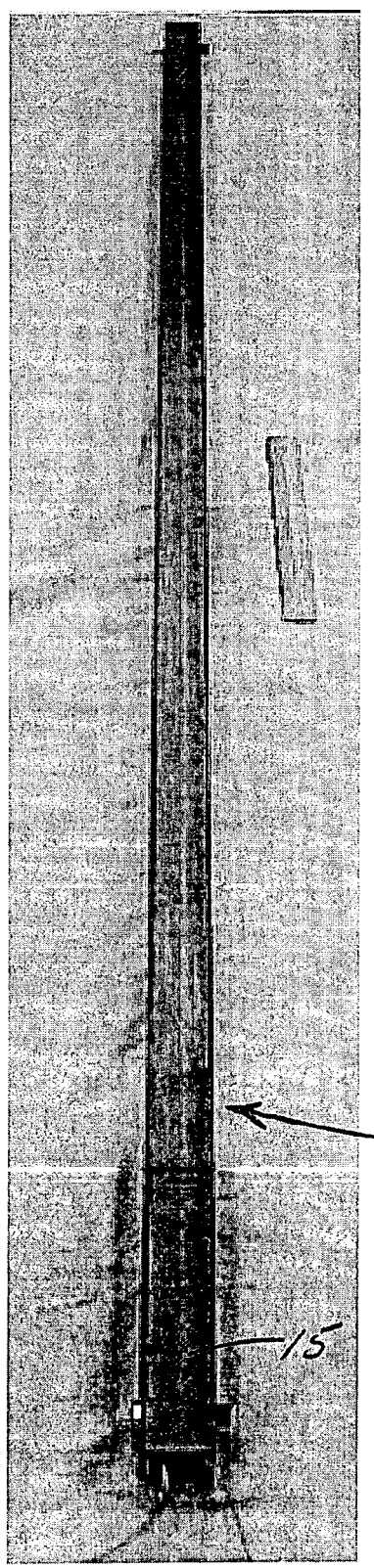
FIG. 4 is a top perspective view of a large amorphous core transmitter antenna used with the present invention.

Referring to FIG. 4 magnetic core transmit antenna 14, which includes a long ferrite or magnetic material core with excitation windings, is illustrated. In one embodiment, a plurality of ferrite blocks, each about 1 inch wide by 0.5 inch high and 3 inches long, is glued together to form a closely bound chain. Suitable ferrite blocks are Phillips 3C90 soft ferrite blocks. A plastic, or similar, housing 15 encloses and protects the ferrite core. An array of windings connected in series/parallel combinations is employed to maximize the power transfer from the electronics into the ferrite core, thus maximizing the field distribution. The ferrite core transmit antenna 14 is a much smaller profile than a conventional loop transmit antenna.

Figure 5:
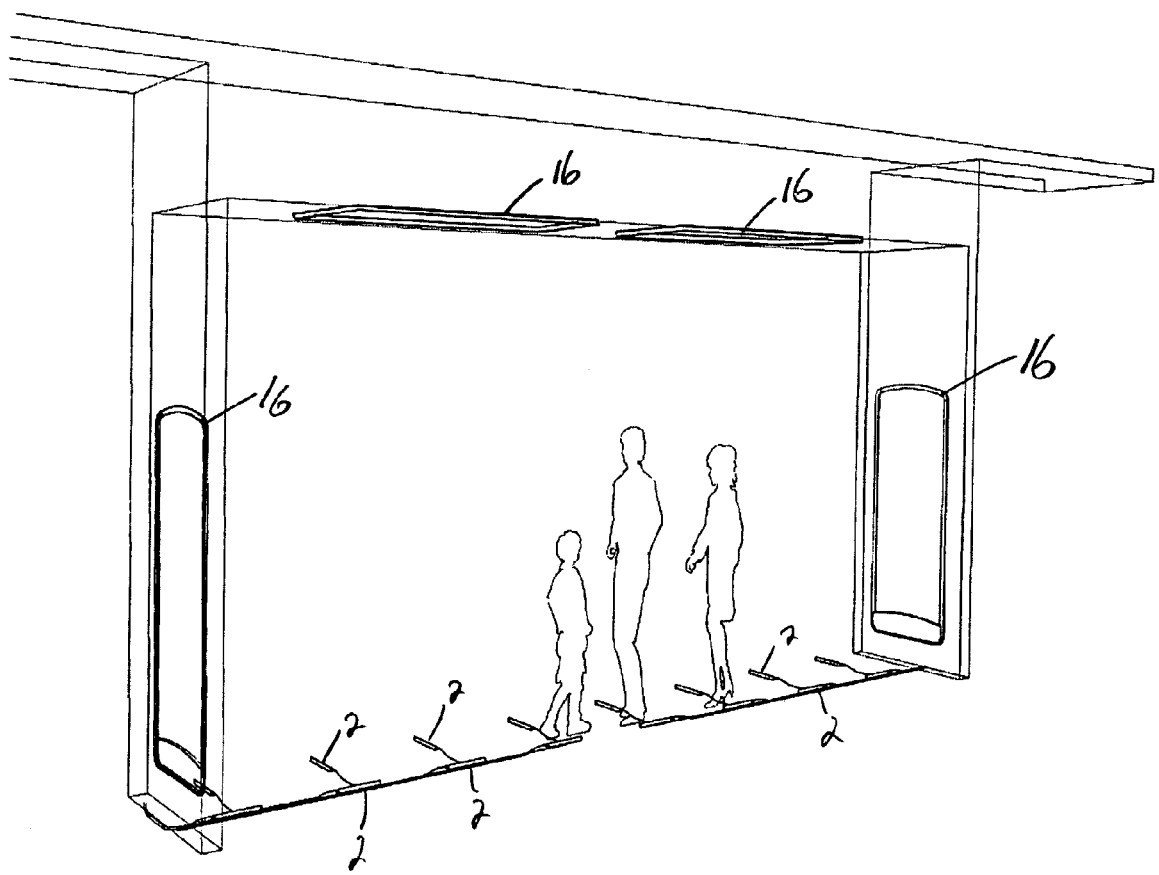
FIG. 5 is a schematic representation of one embodiment of the present invention.

Referring to FIG. 5, a wide store entrance with an array of conventional loop antennas 16 is illustrated. Two loop antennas 16 are shown overhead and one on each sidewall. An array of small core receiver antennas 2 are mounted in the floor. Testing using a conventional magnetomechanical EAS system resulted in an overall pick rate of 97% with the configuration shown in FIG. 5 in an entrance with dimensions of 14 feet wide and 10 feet high.

Figures 6, 7, 8:
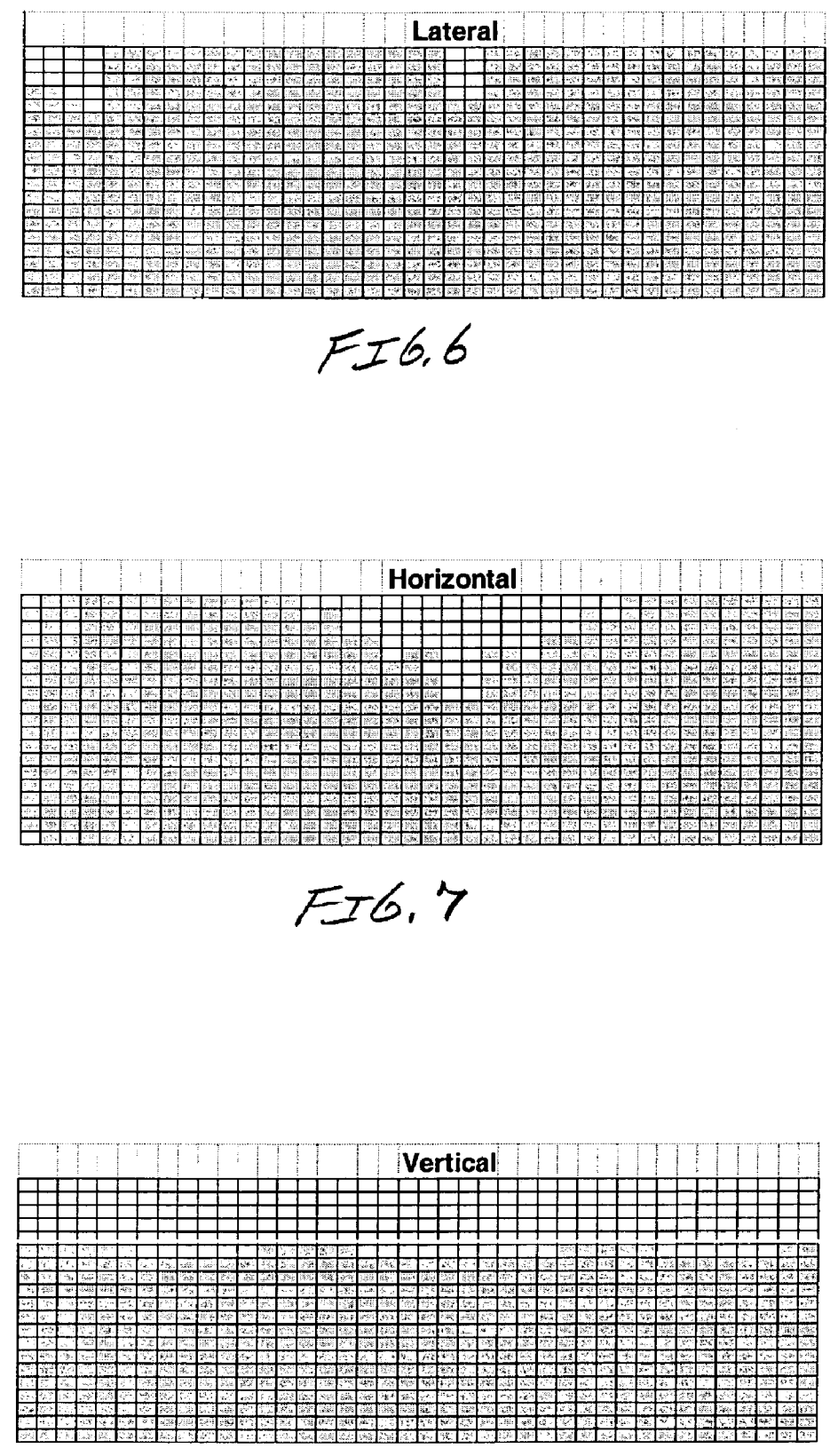

Referring to FIGS. 6–8, the results of the above-mentioned performance test in a 14-foot wide by 10-foot high entrance are shown for an EAS tag in the lateral, horizontal, and vertical orientations, respectively. The pick rate is an indication of system performance and indicates how well the system can detect an EAS tag in the surveillance zone of the store entrance formed by the antenna configuration. It is the probability of tag detection. The shaded area of each figure shows detection of an EAS tag. In the examples below the pick rate is determined in the region extending from 0 to about 150 centimeters above the floor.

Figure 9:
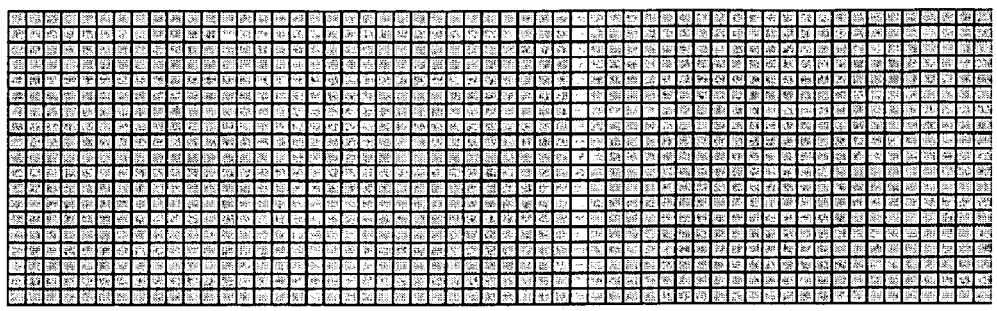
FIGS. 9–11 are plots of the EAS tag pick rate for the embodiment of FIG. 5 for an 18-foot wide by 10-foot high entrance.
Figure 10:
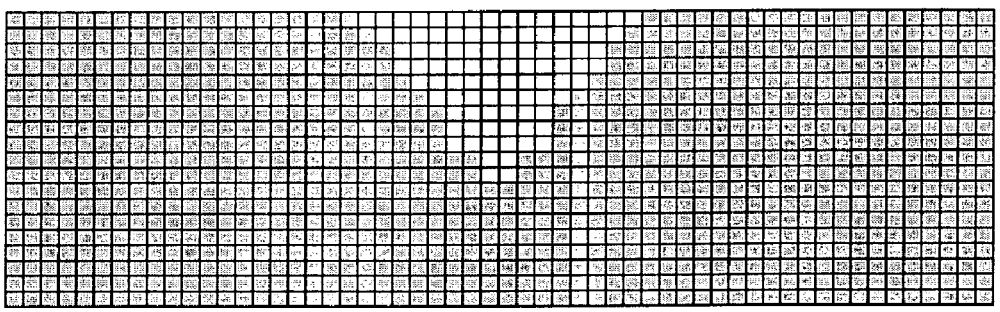
Figure 11:
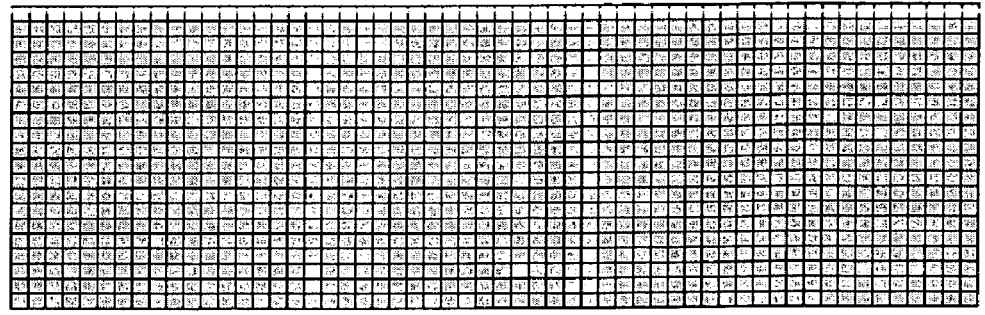

Referring to FIGS. 9–11, the results of a similar test to the above-mentioned performance test for an 18-foot wide by 10-foot high entrance are shown for the lateral, horizontal, and vertical orientations, respectively, with an overall pick of 94%.

Figure 12:
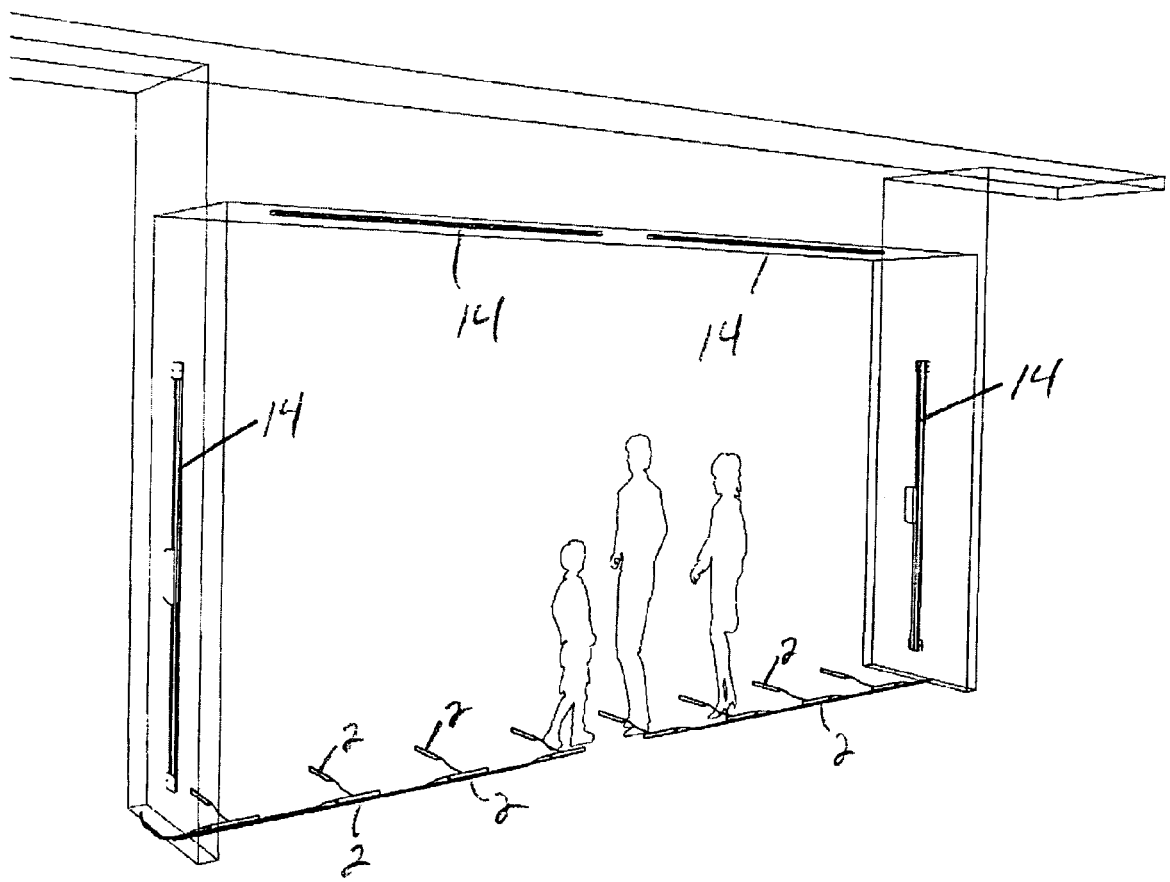
FIG. 12 is a schematic representation of a second embodiment of the present invention.

Referring to FIG. 12, a wide store entrance with an array of ferrite transmit antennas 14 is illustrated. Two ferrite transmit antennas 14 are mounted in or on the ceiling, and one on each sidewall. An array of small core receiver antennas 2 are mounted in the floor. Testing using a conventional magnetomechanical EAS system resulted in an overall pick rate of 94% with the configuration shown in FIG. 12 in an entrance with dimensions of 14 feet wide and 10 feet high.

Figures 13, 14, 15:
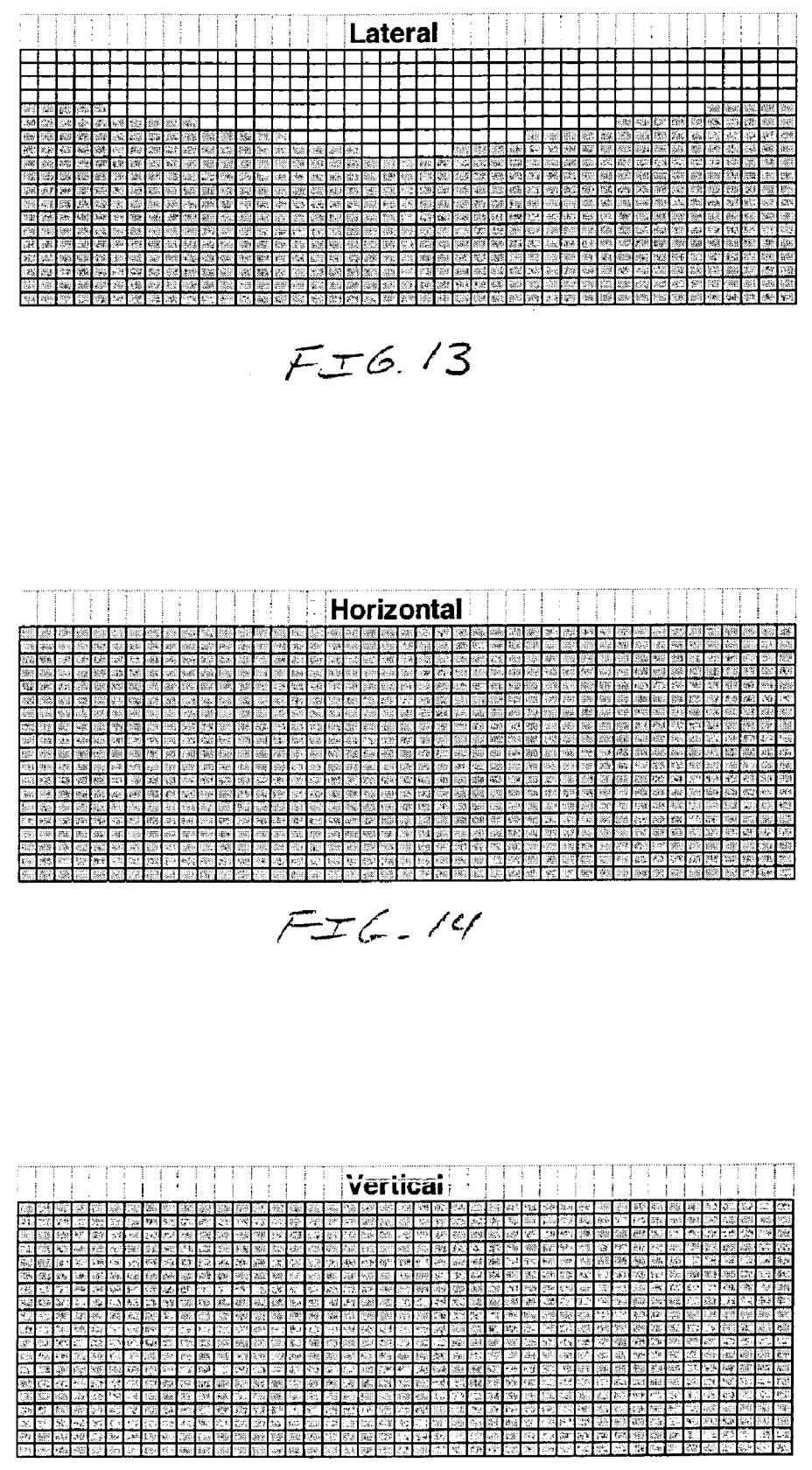

Referring to FIGS. 13–15, the results of the above-mentioned performance test for the configuration shown in FIG. 12 in a 14-foot wide by 10-foot high entrance are shown for the lateral, horizontal, and vertical orientations, respectively.

Figure 16:
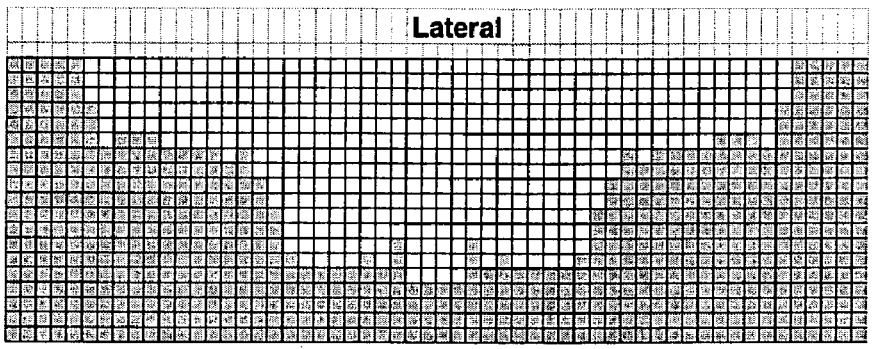
FIGS. 16–18 are plots of the EAS tag pick rate for the embodiment of FIG. 12 for an 18-foot wide by 10-foot high entrance.
Figure 17:
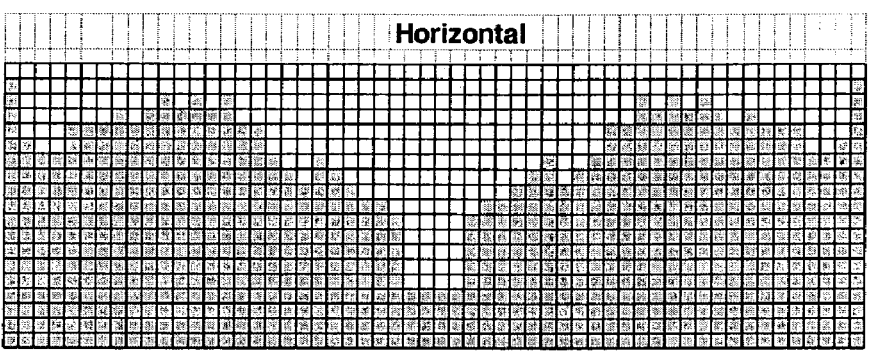
Figure 18:
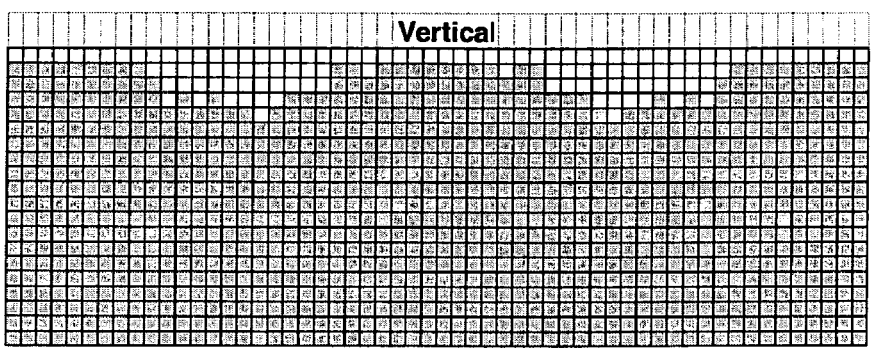

Referring to FIGS. 16–18, the results of a similar test to the above-mentioned performance test in an 18-foot wide by 10-foot high entrance are shown for the lateral, horizontal, and vertical orientations, respectively, with an overall pick of 83%.

Figure 19A:
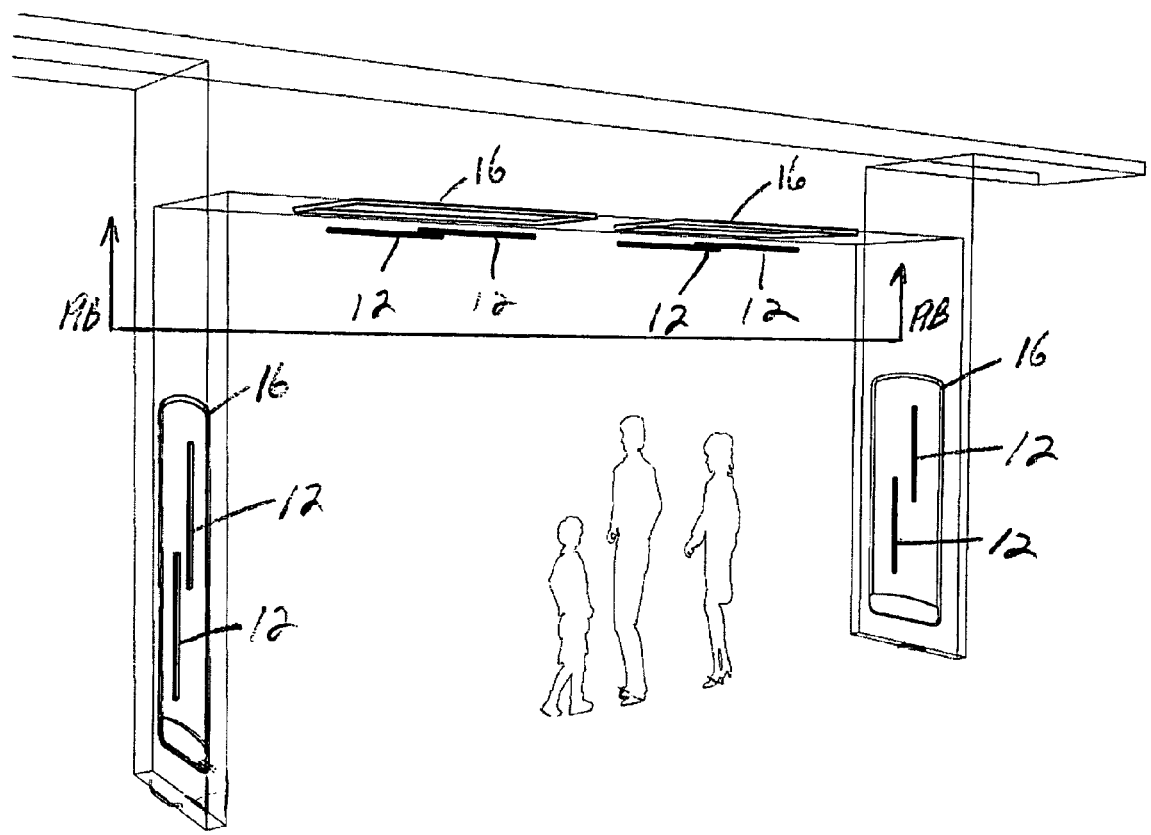
FIG. 19A is a schematic representation of a third embodiment of the present invention.
Figure 19B:
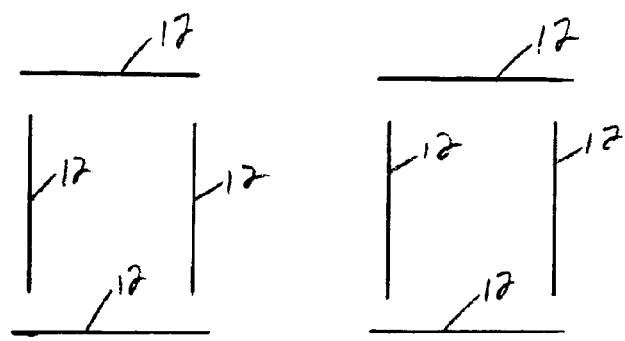
FIG. 19B is a partial cross-sectional view taken along line 19B in FIG. 19A.

Referring to FIG. 19A, a wide store entrance with an array of conventional loop antennas 16 and an array of large amorphous core receiver antennas 12 is illustrated. An array of core receiver antennas 12 are mounted in or on the ceiling, and two on each sidewall. Referring also to FIG. 19B, the array of core receivers 12 is shown and includes two sets of four antennas in the orientation illustrated. The loop antennas 16 are not shown in FIG. 19B for clarity. Testing using a conventional magnetomechanical EAS system with the configuration shown in FIGS. 19A and 19B in an entrance with dimensions of 14 feet wide and 10 feet high resulted in a maximum pick rate of 91% with the overhead receiver antennas mounted at 8.5 feet above the floor.

Figures 20, 21, 22:
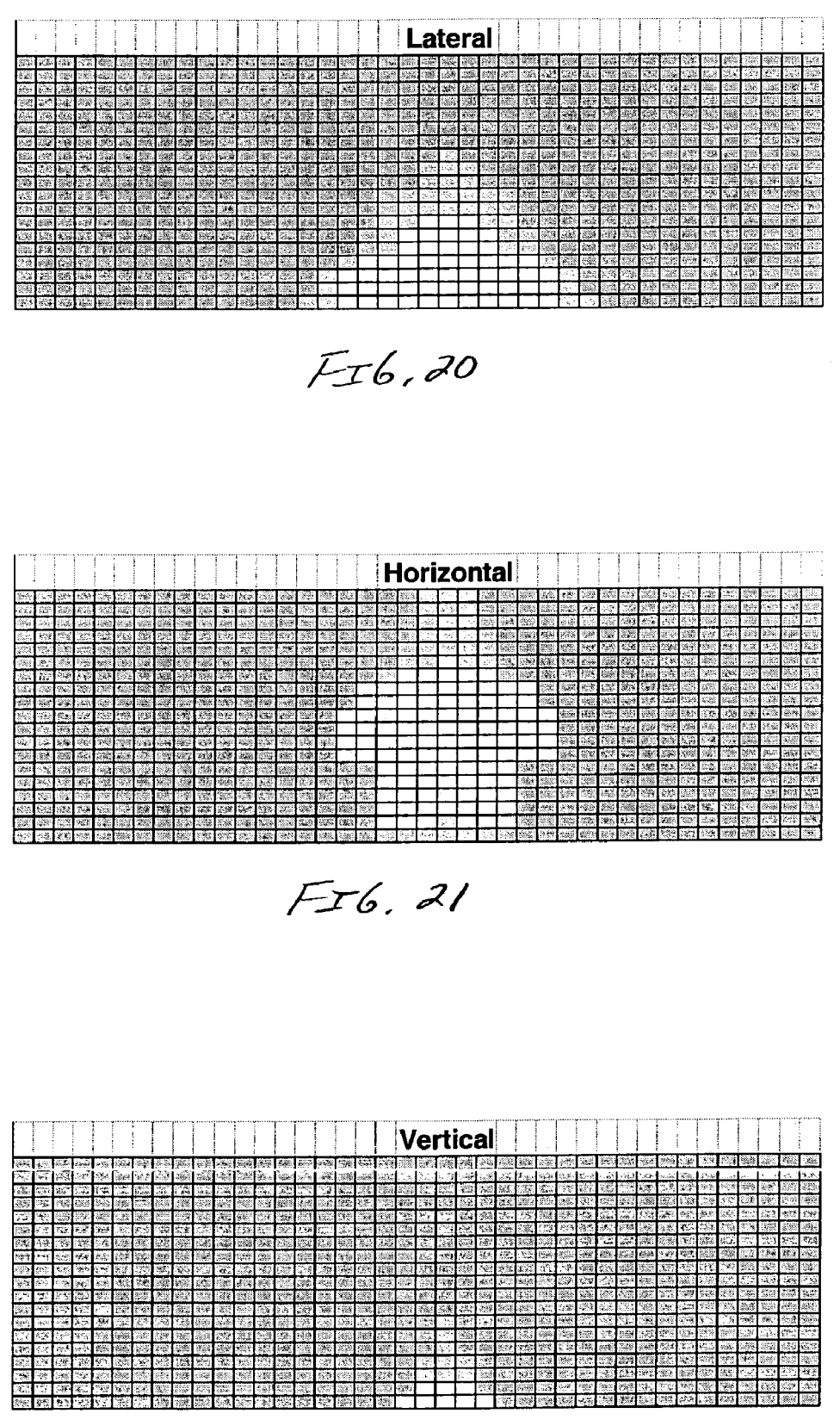

Referring to FIGS. 20–22, the results of the above-mentioned performance test for the configuration shown in FIG. 19 in a 14-foot wide by 10-foot high entrance are shown for the lateral, horizontal, and vertical orientations, respectively. If small core receiver antennas 2 mounted in the floor are added to this configuration, the pick rate increases to 100%.

Additional configurations resulted in reduced pick rate performance in comparison to the examples illustrated hereinabove. The pick rates demonstrated in the above configurations compare favorably with conventional EAS systems and result in interrogation zones covering wide entrances and are installable in an existing retail store without tearing up the flooring to the extent required for conventional antennas.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. An electronic article surveillance antenna system for wide exit interrogation zones, comprising:
   a first and a second transmit antenna, each of said first and said second transmit antennas adapted for installation on opposite sides of a wide interrogation zone;
   a third transmit antenna adapted for installation within a region across at least a portion of the wide interrogation zone, said first, said second, and said third transmit antennas connectable to a transmitter for generation of an interrogation signal for transmission into the wide interrogation zone; and,
   a plurality of amorphous core receiver antennas adapted for installation within a region across at least a portion of the wide interrogation zone, wherein an output of each of said plurality of amorphous core receiver antennas being connectable to a receiver for detection of a response signal from an electronic article surveillance tag disposed in the wide interrogation zone, said response signal responsive to said interrogation signal, wherein said plurality of amorphous core receiver antennas comprises plurality of orthogonal pairs of amorphous core receiver antennas.

2. The system of claim 1 further comprising a fourth transmit antenna.

3. The system of claim 1 wherein each of said transmit antennas are loop antennas.

4. The system of claim 1 wherein each of said transmit antennas are magnetic core antennas.

5. An electronic article surveillance antenna system for wide exit interrogation zones, comprising:
   a first and a second transmit loop antenna, each of said first and said second transmit loop antennas adapted for installation on opposite sides of a wide interrogation zone;
   a third transmit loop antenna adapted for installation within a region across at least a portion of the interrogation zone, said first, said second, and said third loop transmit antennas connectable to a transmitter for generation of an interrogation signal for transmission into the wide interrogation zone; and,
   a plurality of amorphous core receiver antennas, one each adapted for installation on opposite sides of the wide interrogation zone and one each adapted for installation proximate said third transmit loop antenna, wherein an output of each of said plurality of amorphous core receiver antennas being connectable to a receiver for detection of a response signal from an electronic article surveillance tag disposed in the wide interrogation zone, said response signal responsive to said interrogation signal, wherein said plurality of amorphous core receiver antennas comprises plurality of orthogonal pairs of amorphous core receiver antennas.

6. The system of claim 5 further comprising two each of said plurality of amorphous core receiver antennas adapted for installation on opposite sides of the wide interrogation zone and two each of said plurality of amorphous core receiver antennas adapted for installation adjacent said third transmit loop antenna.

7. The system of claim 6 further comprising a fourth transmit loop antenna and two each of said plurality of amorphous core receiver antennas adapted for installation adjacent said fourth transmit loop antenna.

8. The system of claim 7 further comprising two additional pairs of amorphous core receiver antennas each pair adapted for installation adjacent said third and said fourth transmit loop antennas, respectively, wherein four each of said amorphous core receiver antennas being disposed in a substantially rectangular pattern and being mounted adjacent each of said third and said fourth transmit loop antennas, respectively.

* * * * *